United States Patent [19]

Nguyen et al.

[11] Patent Number: 6,037,417
[45] Date of Patent: Mar. 14, 2000

[54] POLYPROPYLENE COMPOSITION USEFUL FOR MAKING SOLID STATE ORIENTED FILM

[75] Inventors: Tinh N. Nguyen, Falls Church, Va.; Roger A. Phillips, Perryville, Md.

[73] Assignee: Montell Technology Company BV, Netherlands

[21] Appl. No.: 09/135,812

[22] Filed: Aug. 18, 1998

[51] Int. Cl.$^7$ .................................................. C08L 23/00
[52] U.S. Cl. ........................................ 525/240; 528/232
[58] Field of Search .................................... 525/232, 240

[56] References Cited

U.S. PATENT DOCUMENTS 5,530,065  6/1996  Farley et al. ............................ 525/240

*Primary Examiner*—Mark L. Warzel

[57] ABSTRACT

Disclosed is a polypropylene composition useful for making solid state oriented film. The composition comprises two predominantly isotactic polypropylenes with the melting point temperature of one of the polypropylenes being substantially lower than the melting point temperature of the other. In one embodiment of the composition the higher melting point polypropylene is made by Ziegler-Natta catalysis, while the lower melting point polypropylene is made by metallocene catalysis. Compared to polypropylene with similar melt flow rate and made by Ziegler-Natta catalysis, and solid state oriented film thereof, the composition provides a better balance of elevated temperature draw characteristics and physical properties of oriented film made therefrom. Thus, at the same or lower elevated temperature yield stress, oriented film of the composition exhibits improved properties such as stiffness, elongation-at-break, dimensional stability, and oxygen barrier.

Also disclosed is a method for the manufacture of oriented, flexible packaging film. In the method a cast sheet is melt extruded from the composition, and, after cooling until it is solid, the cast sheet is stretched to the desired extent of orientation at a temperature which the sheet does not break while being stretched, but below the $T_m$ of the composition. The resulting film then is cooled to at least the crystallization temperature of the lower melting point polypropylene.

10 Claims, No Drawings

POLYPROPYLENE COMPOSITION USEFUL FOR MAKING SOLID STATE ORIENTED FILM

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

This invention resides in the chemical arts. More particularly, it relates to the chemical art having to do with synthetic resins derived from 1-olefins, also known as alpha olefins. Specifically, it relates to synthetic resins formed by the polymerization of propylene, and to film made therefrom.

BACKGROUND OF INVENTION

The synthetic resin formed by the polymerization of propylene as the sole monomer is called polypropylene. While "polypropylene" has been used from time to time in the art to include a synthetic resin formed by the copolymerization of propylene and a minor amount of another monomer, such as ethylene, the term is not so used herein. The resin generally is a mixture of propylene homopolymers of different chain lengths and thus different molecular weights. However, it usually is referred to simply as "polymer".

The well-known polypropylene of commerce is a predominantly isotactic, predominantly crystalline, thermoplastic polymer. It is formed by the polymerization of propylene by Ziegler-Natta catalysis. As is well known, in such catalysis the polymerization catalyst comprises the reaction product of an organic compound of a metal of Groups I–III of the Periodic Table (for example, an aluminum alkyl), and an inorganic compound of a transition metal of Groups IV–VIII of the Periodic Table (for example, a titanium halide). The polymerization conditions generally are well known also.

Such polypropylene has achieved tonnage use in many applications, one of which is the manufacture of film, especially biaxially oriented film used in the packaging of, for example, snack foods such as potato chips and the like. Indeed, such film has become known as "BOPP" film.

Oriented polypropylene film generally is made by a method comprising solid state orientation. One such method is the tubular blown or double bubble method. Another is the tenter frame method.

In one embodiment of the tubular blown or double bubble method, a composition consisting essentially of polypropylene is melt extruded through an annular die to form a molten tube which is brought into contact with an internal, cooling mandrel where it begins to solidify. The tube is further cooled in a water bath, and pulled through a pair of rolls which compress it tightly. After passing through the rolls, the cooled, solidified tube is "softened" by reheating with, for example, radiant heaters to a temperature below the melting point of the polypropylene, but high enough to enable the tube to be expanded by internal air pressure. The tube is insufflated by air under pressure. This causes the tube to enlarge and form a controlled bubble, thereby stretching the wall of the tube in all directions, and thereby biaxially orienting it. The bubble then is collapsed through frame rollers, between a pair of nib rolls, and passed through a slitter where the flattened bubble is slit into a strip or strips which is or are wound on a take-up reel or take-up reels.

In the tenter frame method a composition consisting essentially of polypropylene is melt extruded through a slot die to form a molten sheet. The sheet is solidified by quench cooling onto a cast roll. In the on-line orientation practice of this method, the resulting cast sheet is immediately reheated to a temperature below the melting point of the polypropylene, but high enough to enable the composition to be drawn or stretched. In the case of sequential orientation, the thus "softened" cast sheet is drawn by rolls rotating at different speeds of rotation such that the sheet is stretched to the desired draw ratio in the longitudinal direction (machine direction). The thus uniaxially oriented sheet is subsequently clamped at its lateral edges by chain clips and conveyed into a tenter oven where it is again reheated to such a temperature, and drawn in the transverse direction to the desired draw ratio by means of the chain clips which are diverged in their forward travel. The resulting biaxially oriented film is released from the clips, edge-trimmed, and wound on a take-up reel.

Under development in recent years has been the polymerization of 1-olefins by metallocene catalysis. In fact, the development of such has reached the stage at which at least one polypropylene producer has made commercially available samples of predominantly isotactic polypropylene produced by the metallocene catalyzed polymerization of propylene. In such catalysis the polymerization catalyst comprises the reaction product of a metallocene and a compound such as an alumoxane, trialkyl aluminum or an ionic activator. A metallocene is a compound with at least one cyclopentadienyl moiety in combination with a transition metal of Groups IV–VIII of the Periodic Table.

DESCRIPTION OF RELATED ART

The U.S. Pat. No. 5,530,065 to Farley, et al. (see also WO 95/13321), discloses a blend of (a) a metallocene catalyzed polymer with narrow molecular weight distribution and composition distribution, and (b) a conventional Ziegler-Natta catalyzed polymer with broad molecular weight distribution and composition distribution. The blend is disclosed as being useful in heat sealable, unoriented or oriented film. The patent generally discloses making unoriented film by extruding the blend in the molten state through a flat die and cooling. It discloses making oriented film by the blown film method, that is, by extruding the blend in the molten state through an annular die, blowing and cooling to form a tubular film, and then axially slitting and unfolding to form a flat film.

Although the patent discloses that the polymers can be formed by polymerizing or copolymerizing one or more of $C_2$–$C_{12}$ alpha olefins, examples of which include propylene, the more specific disclosures are focused on polyethylene and ethylene copolymers. The patent is silent on properties of propylene homopolymers made by metallocene catalysis, properties of propylene homopolymers made by conventional Ziegler-Natta catalysis, and on the more specific temperature conditions in the disclosed ways of making film.

The PCT published application WO 96/11218, the publication date of which is Apr. 18, 1996, discloses a multistage process for the polymerization of one or more than one olefin of the formula $CH_2$=$CHR$ in which R can be alkyl having 1–10 carbon atoms. In the first polymerization stage one or more than one such olefin is or are polymerized by Ziegler-Natta catalysis to form particles of a first polymer. In the next polymerization stage, a polymer of one or more than one such olefin is formed by metallocene catalysis on or in the particles of the first polymer. However, except for the end products of the Examples of the application, which end products are so-called impact copolymers of propylene, and which are made by seqential polymerization of propylene and a mixture of propylene and ethylene, the application does not disclose properties of the products of the process.

The published European Patent Applications, EP 0 841 371 A2, EP 0 841 372 A2 and EP 0 841 373 A2, of Mitsui Chemicals, Inc., disclose a propylene polymer composition, the desired MFR of which is 5–50 g/10 min, which comprises a propylene polymer (A3) prepared by Ziegler-Natta catalysis, having a desired MFR of 0.01–30 g/10 min, and being at a desired concentration of 10–90% by weight, and a propylene polymer (A2) prepared by metallocene catalysis, having a desired MFR of 30–1,000 g/10 min, and being at a desired concentration of 10–90% by weight. This composition is stated to be excellent not only in heat resistance, rigidity and tensile elongation at break, but also in moldability.

TECHNICAL DEFINITIONS

"film" means a sheet 10 mils (254 $\mu$m) or less thick.

"MFR" means melt flow rate in decigrams per minute ("dg/min"), or grams in ten minutes (g/10 min"), as measured according to ASTM Method D 1238, Condition L.

"% mmmm" means the percent by weight of isotactic pentad units in which the methyls are in stereo alignment as determined by nuclear magnetic resonance ("NMR") measurements. It is a measure of isotacticity. The greater the percentage, the greater the isotacticity.

"PI" means Theologically determined polydispersity index. It is a measure of molecular weight distribution. The higher the value, the wider the distribution.

"iPP" means a predominantly isotactic polypropylene.

"predominately isotactic polypropylene" means a polypropylene in which the propylene monomer units in each polymer chain are spatially arranged so that the methyl groups thereof project from the chain in the same stereo relationship, as determined by NMR, with regularity sufficient for crystallization.

"m-iPP" means an iPP that has been made by metallocene catalysis.

"$T_c$" is the temperature in degrees Centigrade ("° C."), as determined by differential scanning calorimetry, at which a crystallizable, molten polymer reaches maximum crystallization when cooled until it solidifies.

"$T_m$" is the temperature in degrees Centigrade ("° C."), as determined by differential scanning calorimetry, at which the crystalline fraction of a normally solid, thermoplastic polymer with crystallinity, or co-crystallized fraction of a normally solid, thermoplastic polymer blend with crystallinity, becomes completely molten when the solid polymer or blend is heated.

"XI" means the fraction of a polymer, that is insoluble in xylene at 25° C. It is measured by dissolving a weighed quantity of the polymer in boiling xylene, cooling the solution to that temperature, and weighing the xylene-free, solid precipitate. It is expressed as a percent by weight of the polymer. It is a measure of crystallinity. The greater the percentage, the greater the crystallinity.

"ZN-iPP" means an iPP that has been made by Ziegler-Natta catalysis.

BRIEF SUMMARY OF THE INVENTION

This invention is based on the discovery that, compared to a biaxially oriented film made from a ZN-iPP, a biaxially oriented film made under substantially the same conditions from a polypropylene composition with substantially the same MFR as the ZN-iPP, and consisting essentially of a ZN-iPP and an m-iPP, has certain significantly improved properties. While the two polypropylenes of the composition are predominantly isotactic, they differ in that the Tm of the m-iPP is substantially lower than the Tm of the ZN-iPP. The composition allows for a balance of elevated temperature draw characteristics and final film properties, which balance is substantially improved compared to the balance obtained with the first mentioned ZN-iPP. Compared to the first mentioned ZN-iPP, the composition exhibits an expanded, film processing window. Compared to oriented film made from the first mentioned ZN-iPP, oriented film made from the composition at the same or lower elevated temperature yield stress, exhibits improved properties. These improved properties include stiffness, elongation-at-break, dimensional stability, and oxygen barrier. These improved properties make the oriented film from the composition especially useful in flexible film packaging, particularly in oxygen sensitive food and medical packaging.

In summary, the invention in one aspect is a composition comprising a mixture of two iPPs with the Tm of one of the iPPs being substantially lower than the Tm of the other. One embodiment of the composition comprises a melt blend consisting essentially of the two iPPs.

One of the utilities of the composition is in the manufacture of oriented film. Consequently, the invention in another aspect comprises sheet made from the composition. Embodiments of the sheet include oriented film and cast sheet useful for making oriented film. Oriented film includes uniaxially oriented film as well as biaxially oriented film.

Moreover, this invention in another aspect comprises a method for the manufacture of oriented film by the tenter frame procedure. In the method a cast sheet is melt extruded from the composition, and after cooling until it is solid, the cast sheet at a temperature at which the sheet does not break while being stretched, but below the $T_m$ of the composition, is stretched to the desired extent of orientation and film thickness. The resulting oriented film then is cooled to at least the $T_c$ of the composition.

DETAILED DESCRIPTION OF THE INVENTION

In a preferred embodiment of the composition of this invention, one of the iPPs of the composition, which iPP is referred to hereinafter from time to time as the first iPP, is a ZN-iPP. In other embodiments the first iPP is an iPP made by polymerizing propylene by other than Ziegler-Natta catalysis, for example, metallocene catalysis.

However, in all embodiments intended for use in oriented film manufacture based on the solid state orientation method, the first iPP preferably has these properties:

MFR = 0.5–10 dg/min
% mmmm = 85–100
$T_m$ = 160–167° C.

Numerical values outside these minimum and maximum numerical values are within the broader scope of this invention, provided the basic concepts of the invention are met.

As above indicated, the other iPP in all embodiments of the composition, which hereinafter is referred to from time to time as the second iPP, is characterized by its $T_m$ being substantially lower than that of the first iPP. In the above-mentioned preferred embodiment, it is an m-iPP. In other embodiments it is an iPP made by other than metallocene catalysis, for example, Ziegler-Natta catalysis, and having such $T_m$.

In all embodiments of the composition intended for use in the manufacture of oriented film by the solid state orientation method, the second iPP preferably has these properties:

MFR = 0.5–200 dg/min
% mmmm = 75–98
$T_m$ = 110–160° C.

Numerical values outside these minimum and maximum numerical values are within the broader scope of this invention, provided the basic concepts of the invention are met.

For use in the manufacture of oriented film by the tenter frame method, the MFR of the composition preferably is 1–10 dg/min. Accordingly, the first iPP and second iPP and their relative concentrations preferably are selected to result in this MFR.

In general, the weight ratio of the second iPP to the first iPP in the composition is in the range from about 5:95 to about 95:5. Operable weight ratios lower and higher than these minimum and maximum ratios are within the broader scope of this invention. More specifically, selection of the relative weight ratio depends on the second iPP $T_m$ and the isotacticity of the first iPP. At a given isotacticity of the first iPP, the closer the $T_m$ of the second iPP is to the $T_m$ of the first iPP, the higher its concentration should be relative to that of the first iPP to achieve the benefits of this invention. The higher the isotacticity of the first iPP relative to the second iPP, the lower the weight ratio of the second iPP to the first iPP can be.

In most instances, each of the two essential polypropylenes used to make the composition of this invention will comprise at least an antioxidant generally at a conventional concentration effective to minimize oxidative degradation of the polypropylene. In some embodiments one or both of the essential polypropylenes comprise other stabilizer material selected from the group consisting of antioxidants, heat stabilizers, ultraviolet light inhibitors, and the like. Moreover, they each can comprise other additives, for example, nucleating agent material, filler material, extender material, colorant material, antacid material and property improver material.

Besides the additive or additives included with the essential polypropylenes, the composition can contain other additives such as, for example, additional stabilizer material, antacid material, colorant material and nucleating agent material.

The composition of this invention is made by conventional ways and means. In one way, particles of each iPP, whether in the form of pellets, granules, flake or the like, and either with or without any additives, are mixed together to form a simple mixture. In another way, the particles of each iPP, either with or without additives, are blended together under melt conditions. The melt blend thus formed can than be used in its molten condition, as in the manufacture of film, or extruded through a die to form pellet-thick strands or a pellet-thick strand which are or is cooled until solid, and then chopped into pellets for future use.

The composition also can be made by the multistage process of the above cited PCT published application WO 96/11218. In such case the product of the process is in the form of particles consisting essentially of both polymers.

As above indicated, one utility of the composition of this invention is in the manufacture of oriented film by the solid state orientation method, and of cast sheet for use in the manufacture of oriented film by the tenter frame method.

In such manufacture, cast sheet is formed from the composition by conventional ways and means. In most ways the composition is melt extruded (cast) through a sheeting die to form a molten sheet of selected thickness. This thickness is such that in the subsequent stretching or drawing of the cast sheet an oriented film of the desired thickness is obtained. The molten sheet is cooled until it has solidified. If it is to be oriented at a later time, the solid, cast sheet is further cooled to ambient temperature (usually 20–25° C.) and stored for future orientation.

In any event, for orientation the solid sheet is reheated to a temperature at which the sheet does not break while being stretched, but below the $T_m$ of the composition (now a solid melt blend). In this regard, because of co-crystallization effects, the $T_m$ of each of the polymer components is not actually observed in the solid melt blend. The sheet at such a temperature is stretched in one direction, transversely to that direction, or both (sequentially or at the same time), to the desired extent of orientation and film thickness. The resulting film then is cooled until its temperature is at least at, and preferably below, the $T_c$ of the composition.

Biaxially oriented film made by the solid state orientation method from the composition of this invention with MFR in the range of 1–10 dg/min results in substantial improvements in processing, and has a substantially improved balance of processing and properties compared to biaxially oriented film made under substantially the same set of conditions from ZN-iPP with substantially the same MFR, and to biaxially oriented film made under substantially the same set of conditions from m-iPP with substantially the same MFR. The composition exhibits an expanded processing window, and reduced biaxial yield stress. For the same or lower elevated temperature biaxial yield stress, film of the composition exhibits improved properties. These properties include room temperature tensile modulus and elongation-at-break, dimensional stability, and improved, oxygen and water vapor barrier properties.

The best mode now contemplated of carrying out this invention is illustrated by the following Examples.

EXAMPLE 1

This example illustrates a specific embodiment of the composition of this invention.

The formulation of this embodiment is:

| Components | Parts By Weight |
| --- | --- |
| ZN-iPP | 60 |
| m-iPP | 40 |
| Stabilizer material | 0.22 |

The ZN-iPP in this embodiment is Pro-fax 6701 resin, a pelletized polypropylene of commerce made by Ziegler-Natta catalysis. It is available from Montell USA Inc. It contains a conventional phenolic antioxidant at about 0.1% by weight of the product. Typical properties are:

> MFR = 0.83 dg/min
> $T_m$ = 162–164° C. (reheat)
> $T_c$ = 101–104° C. (reheat)
> % mmmm = 86–89
> XI = 95.5 wt %
> PI = 3.95

The m-iPP is EX3825 resin, a pelletized propylene homopolymer product of Exxon Chemical Company. The homopolymer is made by metallocene catalysis. It contains stabilizer material at a small but effective concentration. Typical properties are:

> MFR = 28 dg/min
> $T_m$ = 148.3° C. (reheat)
> $T_c$ = 92.1° C. (reheat)
> % mmmm = 92.3
> XI = 99.5 wt %
> PI = 1.87

The Stabilizer material is any conventional stabilizer composition useful for stabilizing iPP compositions for the manufacture of flexible, packaging film.

The composition of this Example can be in the form of a simple mixture of solid particles (powder as produced in the polymerization process, also known as flake; pellets; granules; spheres; and the like) of the individual iPPs and stabilizer material. In such case the composition is made by conventional physical mixing techniques and equipment.

The composition also can be in the form of particles (pellets and the like) of a melt blend of the individual iPPs and stabilizer material. In this instance the composition is made by conventional melt blending and pelletizing or other particle forming techniques and equipment. Typically, the Tm and Tc of the melt blend are 159.3° C. and 100.5° C.

EXAMPLE 2

This example illustrates a specific embodiment of a biaxially oriented film of this invention, and a method of making it.

Pellets of the Example 1 composition are cast into a 25 mil (635 μm) thick sheet with a Killion extruder (3.8 cm screw, L/D=30) fitted to a 25.4 cm flat die for vertical extrusion. The sheet is quenched on a water-cooled chill roll set at a draw speed of 2.5 m/min. The processing conditions are:

| | |
|---|---|
| Extruder barrel temperatures: | 230-250-250-250-250-250° C. |
| Screen pack: | 0.25/0.15/0.25 mm |
| Screw speed: | 50 rpm |
| Die opening: | 1 mm |
| Chill roll temperatures: | 35–40° C. |

All four sides of a square section of the cast sheet are clamped on a TM Long stretcher. After being heated for 45 seconds to a temperature in the range of 140–155° C., the section is stretched biaxially by the machine at a stretch rate of 9,000% per min to a stretch ratio of 6:1 in both directions. The resulting biaxially oriented film is cooled to room temperature (20–25° C.). The film typically is about 1 mil (25 μm) thick.

Typical properties of the biaxially oriented film are set forth in the following Table I of actual data obtained on biaxially oriented film of this invention. Such film was made from 5.1 cm×5.1 cm specimens of a cast sheet obtained according to this Example 2. The specimens were biaxially stretched as above at different temperatures on a laboratory TM Long stretcher The stretcher equipment included a transducer for high temperature operation, which was mounted on the clamp system, and interfaced with a computer for stress/strain measurements.

The stretched specimens were aged at 23° C. and 50% relative humidity for one week, and then the following physical properties were measured by the following identified procedures:

Tensile strength (stress at break): ASTM D-882

Elasticity (1% secant modulus & elongation-at-break): ASTM D-882

Moisture vapor transmission rate ("MVTR"): ASTM F1249-90 (at 38° C. & 100% relative humidity)

Oxygen transmission rate ("$O_2$TR"): ASTM D3985-81 (at 23.3° C. & dry condition)

Haze and Transmission: measured by a Gardner haze meter

For comparison, the Table includes data obtained on 1 mil (25 μm) thick, biaxially oriented film of a ZN-iPP having these properties:

> MFR = 3.8 dg/min
> $T_m$ = 162.5° C. (reheat)
> $T_c$ = 99.9° C. (reheat)
> % mmmm = 87.4
> XI = 94.3 wt %
> PI = 4.39

Such film was made from 5.1 cm×5.1 cm specimens of a cast sheet made according to this Example 2, but from pellets of the ZN-iPP. The specimens were biaxially stretched as above at different temperatures on a laboratory TM Long stretcher. The film was tested as above.

TABLE I

| Stretch Temperature | 145° C. | | 150° C. | | 155° C. | |
|---|---|---|---|---|---|---|
| Film | Ex 2 | ZN-iPP | Ex 2 | ZN-iPP | Ex 2 | ZN-iPP |
| Biaxial Yield Stress (MPa) | 2.13 | 2.43 | 1.22 | 1.52 | 0.81 | 0.87 |
| Stress at break (MPa) | 186 | 186 | 169 | 179 | 175 | 179 |
| 1% Secant modulus (MPa) | 2080 | 1905 | 2100 | 1990 | 1970 | 1920 |
| Elongation-at-break (%) | 87 | 101 | 99 | 93 | 148 | 130 |
| $O_2$TR (cc/m²/day) | 1678 | 1991 | nm | nm | nm | nm |
| MVTR (g/m²/day) | 7.40 | 6.57 | nm | nm | nm | nm |
| Haze (%) | 0.41 | 0.28 | 0.58 | 0.43 | 1.15 | 2.16 |
| Transmission (%) | 98.5 | 98.6 | 97.3 | 97.1 | 93.3 | 86.4 | nm = not measured

These data demonstrate that for the same or lower elevated temperature biaxial yield stress, the biaxially oriented film of the composition of this invention exhibits improved properties compared to a biaxially oriented film of a ZN-iPP of MFR similar to that of the composition, both films being made by the TM Long tenter frame method under substantially the same conditions. These improved properties make the film of this invention particularly suitable for use as packaging film for oxygen sensitive food and the like.

Additional data were obtained in test work with a tenter frame BOPP film line of commercially relevant scale. Included in the work was a specific embodiment of the composition of this invention. It was a melt blend consisting essentially of 68 parts by weight of a ZN-iPP having these properties:

MFR = 1.2 dg/min
$T_m$ = 167.3° C. (reheat)
$T_c$ = 101.5° C. (reheat)
XI = 99.0 wt %
PI = 4.8 and 32 parts by weight of an m-iPP having these properties:

MFR = 32 dg/min
$T_m$ = 146.6° C. (reheat)
$T_c$ = 101.9° C. (reheat)
XI = 98.4 wt %
PI = 1.7

The MFR of the blend was 2.7. The $T_m$ of the blend was 163.4° C., and its $T_c$ was 106.5° C.

Also included in the test work was a commercial, film grade ZN-iPP, the MFR of which was close to that of the blend. The ZN-iPP had the following properties:

MFR = 3 dg/min
$T_m$ = 164.1° C. (reheat)
$T_c$ = 99.8° C. (reheat)
XI = 95.7% by weight
PI = 4.8

The tenter frame BOPP film line comprised a flat die extrusion unit; a chill roll quenching unit for sheet casting; a machine direction orienter unit (MDO unit) in which the sheet is reheated and, by means of rolls, oriented in the machine direction; a transverse direction orienter unit (TDO unit) where the sheet is reheated in a pre-stretching heating section, stretched in a stretching section in the transverse direction by means of a diverging, rail-bearing, clip system, and annealed in an annealing section; a beta scanner for film thickness control; and a film winding unit.

In the test work, film was made from the blend and from the ZN-iPP at different temperatures in the pre-stretching heating section to determine the stretching temperature operating windows of the blend and the ZN-iPP. In this regard, the temperature to which a film forming composition is heated in the pre-stretching heating section is especially critical. It controls the drawability of the composition, and the uniformity of the film thickness. For any composition, too low a temperature leads to film breakage, while too high a temperature results in partial melting and recrystallization of the composition, and, consequently, a hazy film.

In this test work, the operating conditions of the film line, other than the PHTs, were kept constant, except for the chill roll and line speeds, which were automatically adjusted to maintain the same film thickness when switching from one composition to another. The operating conditions were:

Extrusion Temperature: 240–260° C.
Screw speed: 160 rpm
Chill roll temperature: 30° C.
Temperatures in MDO unit:
preheating rolls: 120° C.(×2)–125° C.(×2)–130° C.(×2)
stretching rolls: 110° C.(×2)–125° C.(×2)–125° C.(×2)
annealing rolls: 130° C.(×4)

Machine direction stretching ratio (MDSR): 5:1
Temperatures in TDO unit:
pre-stretching heating section: variable
stretching section: 160° C.
annealing section: 160° C.

Transverse direction stretch ratio (TDSR): 8:1–9:1
Total area stretch ratio (MDSR×TDSR): 40–45
Film Thickness: 20 μm The film samples obtained in the test work were aged at 23° C. and 50% relative humidity for one week before measuring the physical properties thereof, which are listed in the following Table II. The Young's modulus property was measured by the procedure described in ASTM D-882. The other physical properties listed in Table II, except film shrinkage, were measured by the procedures identified above relative to the properties listed in Table I. The procedure for measuring film shrinkage comprised placing free-standing, 10 cm square, specimens of the film samples on a poly(tetrafluroethylene) pad in a forced air oven for 5 minutes at the temperatures indicated in Table II, and measuring the extent of shrinkage in the machine and transverse directions.

In Table II, "MD" means machine direction, and "TD" means transverse direction.

Also, "PHT" in Table II means the air temperature in the pre-stretching section of the TDO unit. Because of the speed of travel of the machine direction oriented sheet through this section, the sheet did not reach the PHT, but remained below its $T_m$.

TABLE II

| | | Blend | ZN-iPP |
|---|---|---|---|
| MFR (dg/min) | | 2.7 | 3 |
| Processing variables: | | | |
| PHT (° C.)-minimum | | 170 | 164 |
| PHT (° C.)-optimum | | 175 | 175 |
| PHT (° C.)-optimum | | 185 | 185 |
| PHT (° C.)-maximum | | 195 | 197 |
| Chill Roll Speed (rpm) | | 8 | 8 |
| MDO unit amperage | | 10.5 | 11 |
| TDO unit amperage | | 9.9 | 10.6 |
| Line Speed (m per min, at film output end of TDO unit) | | 45 | 45 |
| Film thickness variation 2 sigma | | 0.89 | 0.53 |
| Film Properties: | | | |
| Tensile (MPa) | MD | 170 | 150 |
| | TD | 260 | 260 |
| Youngs modulus (MPa) | MD | 2640 | 2290 |
| | TD | 4600 | 4150 |
| 1% Secant modulus (MPA) | MD | 2410 | 2070 |
| | TD | 3760 | 3360 |
| Elongation-at-break (%) | MD | 158 | 110 |
| | TD | 38 | 37 |
| Film shrinkage @ 120° C. | MD | 3.8 | 4.7 |
| | TD | 5.7 | 5.7 |
| Film shrinkage @ 135° C. | MD | 4.7 | 5.7 |
| | TD | 7.6 | 7.6 |
| Film haze (%) | | 0.17 | 0.3 |
| $O_2$TR (cc/m²/day) - PHT optimum | | 1560 | 1600 |
| $O_2$TR (cc/m²/day) - PHT minimum | | 1455 | nm |
| MVTR (g/m²/day) - PHT optimum | | 5.5 | 6 |
| MVTR (g/m²/day) - PHT minimum | | 5.4 | nm | nm = not measured

In the above Table II the two values of optimum PHT define the temperature window in which good clarity film with low 2 sigma variation in thickness (between 0.5 and 1 μm) is obtained. The minimum PHT in each case is the lowest PHT at which appears uneven stretching as evidenced by white bands or shark skin marks. The maximum PHT in each case is the highest PHT at which the film becomes visibly hazy with dramatic variation in film thickness.

The MDO and TDO amperages are proportional to the stresses necessary to orient the sheet in the machine and transverse directions.

Lower values of film shrinkage indicate better dimensional stability of the film. This parameter is important because BOPP film usually undergoes numerous post-fabrication procedures in which heat is involved, and film integrity is essential.

From the above data it can be seen that while the blend and the ZN-iPP had the same operating temperature window, film made from the blend had substantially improved physical properties compared to film made from the ZN-iPP.

These data also demonstrate that the orientation stresses to biaxially orient the cast sheet of the blend were significantly lower than the orientation stresses to biaxially orient the cast sheet of a ZN-iPP of MFR similar to that of the blend.

Hence, the composition of this invention, compared to ZN-iPP of substantially the same MFR, provides a substantially improved balance of elevated temperature draw characteristics and physical properties of oriented film made therefrom.

OTHER DEFINITIONS

The term "comprises" or the like in this specification means "includes without limitation". It is open ended. It includes the grammatical object or objects recited thereafter without excluding another or other grammatical object or objects.

The expression "consisting essentially of" in this specification excludes an unrecited substance at a concentration sufficient to substantially adversely affect the essential properties and characteristics of the composition of matter being defined, while permitting the presence of one or more unrecited substances at a concentration or concentrations insufficient to substantially adversely affect said essential properties and characteristics.

Other embodiments and features of advantage of this invention will become readily apparent to those exercising ordinary skill in the art after reading the foregoing disclosures. Such embodiments are within the spirit and scope of the claimed subject matter unless expressly excluded therefrom by claim language or as not being within the doctrine of equivalents.

What is claimed is:

1. A composition useful for the manufacture of polypropylene film with solid state orientation, which composition comprises a first predominantly isotactic polypropylene (iPP) and a second iPP with the Tm of the second iPP being at least 7° C. less than the Tm of the first iPP, the weight ratio of the second iPP to the first iPP being in the range from about 5:95 to about 95:5, and the MFR of the composition being about 1–10 dg/min.

2. A composition according to claim 1 in which the first iPP is made by Ziegler-Natta catalysis (ZN-iPP), and the second iPP is made by metallocene catalysis (m-iPP).

3. A composition according to claim 2 in which the ZN-iPP has these properties:

$MFR = 0.5–10$ dg/min  
$T_m = 160–167°$ C.  
% mmmm = 85–100.

4. A composition according to claim 3 in which the m-iPP has these properties:

$MFR = 0.5–200$ dg/min.  
$T_m = 110–160°$ C.  
% mmmm = 75–98.

5. An oriented film of the composition of claim 1.

6. A biaxially oriented film according to claim 5.

7. A cast sheet useful for the manufacture of polypropylene film with solid state orientation, which sheet is composed of the composition of claim 1.

8. A method for making oriented polypropylene packaging film, which method comprises: forming a cast sheet of the composition of claim 1; stretching the sheet at a temperature at which the sheet does not break while being stretched, but below the $T_m$ of the composition, in at least one direction to the desired extent of orientation; and cooling the resulting film until its temperature is at least at the $T_c$ of the second iPP.

9. A method according to claim 8 in which said stretching is in transverse directions, whereby said film is biaxially oriented.

10. A method according to claim 9 in which said stretching is carried out by the tenter frame procedure.

* * * * *